(12) United States Patent
Kato et al.

(10) Patent No.: US 7,041,346 B2
(45) Date of Patent: May 9, 2006

(54) LIQUID CRYSTAL COMPOSITION, LIQUID CRYSTAL DISPLAY ELEMENT, METHOD FOR MANUFACTURING SAME, AND METHOD FOR CONTROLLING SAME

(75) Inventors: Takashi Kato, Kawasaki (JP); Norihiro Mizoshita, Tokyo (JP)

(73) Assignees: Takashi KATO, Kawasaki (JP); JSR Corporation, Tokyo (JP)

( * ) Notice: Subject to any disclaimer, the term of this patent is extended or adjusted under 35 U.S.C. 154(b) by 38 days.

(21) Appl. No.: 10/682,195

(22) Filed: Oct. 10, 2003

(65) Prior Publication Data

US 2004/0099841 A1 May 27, 2004

(30) Foreign Application Priority Data

Nov. 26, 2002 (JP) .............................. 2002-342461

(51) Int. Cl.
C09K 19/52 (2006.01)
C09K 19/38 (2006.01)
C09K 19/54 (2006.01)

(52) U.S. Cl. ................ 428/1.1; 252/299.01; 252/299.5
(58) Field of Classification Search ................. 428/1.1; 252/299.01, 299.5
See application file for complete search history.

(56) References Cited

U.S. PATENT DOCUMENTS 6,333,081 B1 * 12/2001 Horikiri et al. .............. 428/1.1
6,610,216 B1 * 8/2003 Yumoto et al. ......... 252/299.01
6,645,577 B1 * 11/2003 Horikiri ...................... 428/1.1
6,682,787 B1 * 1/2004 Kato et al. .................. 428/1.5
6,740,255 B1 * 5/2004 Kato et al. ............. 252/299.01

OTHER PUBLICATIONS

The Japanese Liquid Crystal Society, Oct. 10, 2002 "Interface orientation control of liquid crystals by hydrogen-bonded fibrous polymer" with Certificate of Disclosure.

* cited by examiner

Primary Examiner—Shean C. Wu
(74) Attorney, Agent, or Firm—Oblon, Spivak, McClelland, Maier & Neustadt, P.C.

(57) ABSTRACT

A liquid crystal composition comprising a liquid crystal compound, a gelling agent comprising a hydrogen-bonded compound with polymerizable double bonds at both ends to form a gelatinizable mixture with the liquid crystal compound, and a photoinitiator causing a polymerization reaction of the hydrogen-bonded compound of the gelling agent is disclosed. Because the denatured liquid crystal composition, obtainable by photo polymerization of the non-denatured liquid crystal composition, has alignment direction self-control characteristics, the liquid crystal composition can be reversibly changed between the isotropic state and the aligned gelatinized state by controlling the temperature conditions not only in a non-denatured state but also in a denatured state. A liquid crystal display element using the liquid crystal composition, a method for manufacturing the same, and a method for controlling the same are also disclosed.

17 Claims, 3 Drawing Sheets

Rubbing direction

LIQUID CRYSTAL COMPOSITION, LIQUID CRYSTAL DISPLAY ELEMENT, METHOD FOR MANUFACTURING SAME, AND METHOD FOR CONTROLLING SAME

BACKGROUND OF THE INVENTION

1. Field of the Invention

The present invention relates to a liquid crystal composition, a liquid crystal display element, a method for manufacturing the same, and a method for controlling the same.

2. Description of Background Art

Super-molecular materials that are formed by a phenomenon causing self-aggregation or self-organization of molecules by intermolecular actions of non-covalent bonding molecules such as a hydrogen bond have been receiving attention in recent years. In particular, a material called "liquid crystal physical gel" is receiving attention as a novel functional material, because the liquid crystal physical gel contains liquid crystals of a functional fluid as a solvent and therefore possesses optical and electrical characteristics of liquid crystals and soft solid characteristics as of a physical gel.

Physical gel is formed from fibrous aggregations of molecules by intermolecular action such as a hydrogen bond. The fibrous aggregations form a network and are gelatinized by adsorbing a solvent in the network to form physical gel. Micro intermolecular action of the physical gel changes according to external stimulus and external environment, which may result in changes in the form of gel aggregation and gel organization. These changes ultimately cause macroscopic property changes in the physical gel. Therefore, a liquid crystal physical gel of which the form of aggregation and organization can be regulated by an external stimulus is expected to become a novel multi-functional material or high function material.

The display functioning layer of a liquid crystal element is generally composed of a liquid crystal substance filled into a cell for the liquid crystal element formed from two sheets of substrates. Alignment of liquid crystal molecules is controlled by utilizing the nature of liquid crystal molecules to align in the rubbing direction of an alignment membrane provided on the internal surface of the substrate.

A liquid crystal composition comprising a liquid crystal compound and a liquid crystal alignment controller that gelatinizes itself and can regulate alignment of the liquid crystal compound to form fibrous aggregates that are aligned in the same direction as the liquid crystal compound in a state in which the liquid crystal compound is aligned in one direction has been proposed (Japanese Patent Application No. 46447/2001).

However, A liquid crystal composition possessing characteristics of regulating the alignment direction of liquid crystal molecules itself, that is, alignment direction self-regulating characteristics, has not been known.

The present inventors have conducted studies on a gelatinizable liquid crystal composition containing a liquid crystal compound and a gelling agent that can form a gelatinizable mixture when mixed with the liquid crystal compound.

As a result, the inventors have found that a certain liquid crystal composition can exhibit alignment direction self-regulating characteristics under specific conditions and that by utilizing the alignment direction self-regulating characteristics in a liquid crystal element using this liquid crystal composition it is possible to realize a state in which the liquid crystal molecules are aligned in a direction that differs from the rubbing direction of the alignment membrane in the liquid crystal element. These findings have led to the completion of the present invention.

An object of the present invention is to provide a novel liquid crystal composition capable of exhibiting alignment direction self-control characteristics and controlling the direction of alignment of liquid crystal molecules by itself in a denatured state, whereby it is possible to align liquid crystal molecules in a direction that differs from the rubbed direction in a display-functioning layer of a liquid crystal display element.

Another object of the present invention is to provide a liquid crystal display element having a display-functioning layer that possesses non-denatured display-functioning regions of the above liquid crystal composition or denatured display-functioning regions of a denatured liquid crystal composition formed by denaturing the above liquid crystal composition.

Still another object of the present invention is to provide a liquid crystal display element having a display-functioning layer that possesses both non-denatured display-functioning regions of the above liquid crystal composition and denatured display-functioning regions of a denatured liquid crystal composition formed by denaturing the above liquid crystal composition, a method for manufacturing the liquid crystal element, and a method for controlling the same.

SUMMARY OF THE INVENTION

The liquid crystal composition of the present invention is characterized by comprising a liquid crystal compound, a gelling agent comprising a hydrogen-bonded compound with polymerizable double bonds at both ends to form a gelatinizable mixture with the liquid crystal compound, and a photoinitiator causing polymerization reaction of the hydrogen-bonded compound of the gelling agent.

The above liquid crystal composition is preferably a cyanobiphenyl liquid crystal compound.

The gelling agent is preferably a hydrogen-bonded compound of the following formula (1).

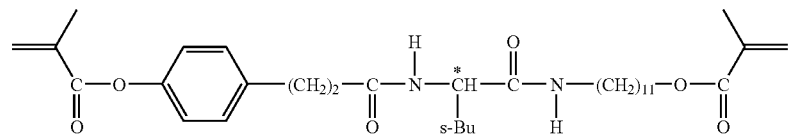

The photoinitiator is preferably a compound of the following formula (2).

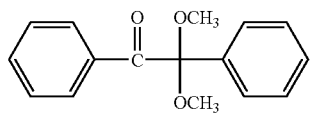

The liquid crystal display element of the present invention is characterized by comprising two sheets of rubbed substrates and a display-functioning layer formed between the substrates having non-denatured display function regions of the liquid crystal composition, wherein fibrous aggregates in which the hydrogen-bonded compound of the gelling agent is aligned by aggregation are formed in the non-denatured display function regions and alignment of liquid crystal molecules is regulated in the rubbing direction.

The liquid crystal display element of the present invention is characterized by comprising two sheets of rubbed substrates and a display-functioning layer formed between the substrates having denatured display function regions of a denatured liquid crystal composition obtained by photopolymerization of the liquid crystal composition, wherein the direction of alignment of liquid crystal molecules in the denatured display-functioning regions is regulated by aligned fibrous polymer molecules produced by photopolymerization.

The liquid crystal display element is characterized by comprising two sheets of rubbed substrates and a display-functioning layer formed between the substrates, the display-functioning layer possessing the above non-denatured display-functioning regions and the above denatured display-functioning regions.

In the above liquid crystal display element, the rubbed directions in the two sheets of substrates are parallel.

The method for manufacturing a liquid crystal display element of the present invention is characterized by comprising selectively irradiating a layer of the above liquid crystal composition formed between two sheets of rubbed substrates with light to form a display-functioning layer comprising the above non-denatured display-functioning regions and denatured display-functioning regions.

The method for controlling a liquid crystal display element of the present invention relates to a method for controlling a liquid crystal element having non-denatured display-functioning regions of liquid crystal composition, in which the liquid crystal molecules change into an aligned gelatinized state at a phase transition temperature of T1, and denatured display-functioning regions of liquid crystal composition, in which the liquid crystal molecules change into an aligned state at a phase transition temperature of T2, wherein the method comprises regulating the display conditions of the non-denatured display-functioning regions and denatured display-functioning regions by holding the display-functioning layer at a temperature higher than T1 or T2, whichever is the higher, holding the display-functioning layer at a temperature lower than T1 or T2, whichever is the lower, or holding the display-functioning layer at a temperature between T1 and T2.

DETAILED DESCRIPTION OF THE INVENTION AND PREFERRED EMBODIMENT

Figure 1:
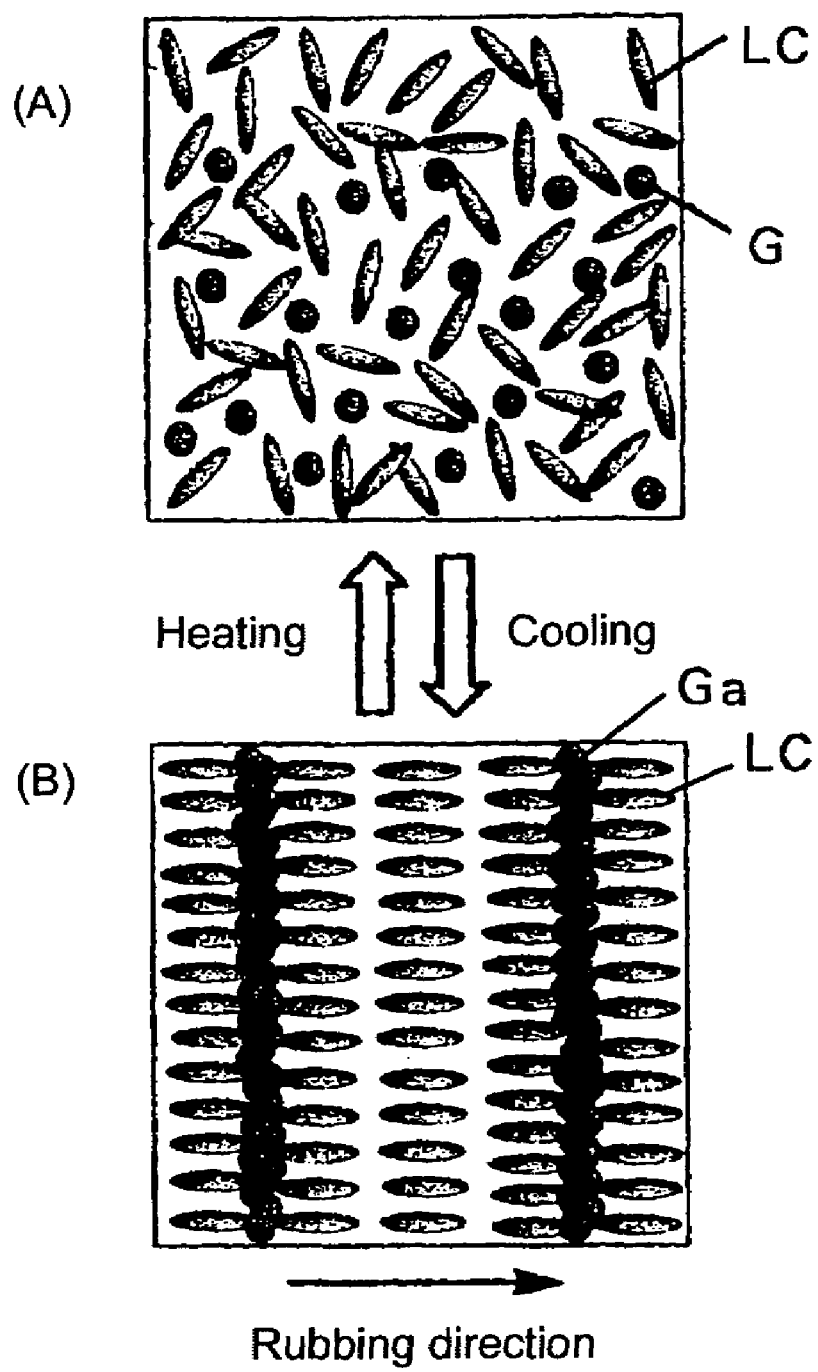
FIG. 1(a) is a drawing schematically showing the conditions of liquid crystal molecules and gelling agent molecules in an isotropic phase state in one embodiment of liquid crystal composition (non-denatured liquid crystal composition) of the present invention and FIG. 1(b) schematically shows the conditions when the liquid crystal composition is in an aligned gelatinized state.

According to the liquid crystal composition of the present invention, not only can the liquid crystal composition in a non-denatured state be reversibly changed between the isotropic state and the aligned gelatinized state by controlling the temperature conditions, but also the denatured liquid crystal composition obtained by photo polymerization of the non-denatured liquid crystal composition in the aligned gelatinized state can be reversibly changed between the isotropic state and the aligned gelatinized state by controlling the temperature conditions, because the denatured liquid crystal composition of the present invention has alignment direction self-control characteristics.

Using the liquid crystal display element of the present invention, a unique display function can be obtained by utilizing both the display function of non-denatured liquid crystal composition and the display function utilizing the alignment direction self-control characteristics of the denatured liquid crystal composition.

According to the method of manufacturing the liquid crystal display element of the present invention, a display-functioning layer possessing non-denatured display-functioning regions of non-denatured liquid crystal composition and denatured display-functioning regions of denatured liquid crystal composition can be formed by a simple means.

According to the method of controlling the liquid crystal display element of the present invention, display conditions in non-denatured display-functioning regions and denatured display-functioning regions can be controlled in a variety of means by controlling the temperature of the display-functioning layer using the phase transition temperature T1, at which liquid crystal molecules of non-denatured liquid crystal composition in the non-denatured display-functioning regions become in an aligned gelatinized state, and the phase transition temperature T2, at which liquid crystal molecules of the denatured liquid crystal composition in the denatured display-functioning regions become in an aligned state, as standards.

The liquid crystal composition of the present invention comprises the following components (1)–(3) as essential components:
(1) a liquid crystal compound,
(2) a gelling agent comprising hydrogen-bonded molecules with polymerizable double bonds at both ends, and
(3) a photoinitiator causing a polymerization reaction of the hydrogen-bonded compound of the gelling agent.

Various liquid crystal compounds can be used either individually or in combination of two or more in the present invention. Cyanobiphenyl liquid crystal compounds are particularly preferable. The mixture of liquid crystal compounds represented by the following formula (A) (hereinafter may be referred to as "liquid crystal compound (A)") can be given as a specific example.

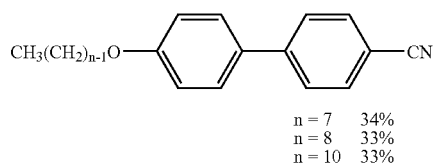

n = 7    34%
n = 8    33%
n = 10   33%

As the gelling agent, a hydrogen-bonded compound with polymerizable double bonds of a group such as a vinyl group, acrylate group, methacrylate group, or allyl group, for example, at both ends can be used. A particularly preferable compound is a hydrogen-bonded compound having a methacrylate group at both ends (hereinafter may be referred to as "hydrogen-bonded compound B") of the above formula (1). The hydrogen-bonded compound B can be prepared by a known method.

As the photoinitiator, a compound that can cause polymerization reaction of the hydrogen-bonded compound used as the gelling agent can be utilized. A particularly preferable photoinitiator is a compound of the above formula (2) (hereinafter referred to as "photoinitiator C").

The proportion of the gelling agent to the liquid crystal compound in the liquid crystal composition of the present invention is, for example, in the range of 0.1–5.0 mass %, and preferably 0.3–3.0 mass %. The proportion of the photoinitiator to the liquid crystal compound varies according to the amount of gelling agent, but is preferably in the range of 0.1–1.0 mass %, for example.

A specific preferable example of the liquid crystal composition of the present invention can be obtained by mixing the liquid crystal compound A, the hydrogen-bonded compound B in the amount of 1.0 mass % of the liquid crystal compound A as the gelling agent, and the photoinitiator C in the amount of 0.1 mass % of the liquid crystal compound A. This composition is referred to as "specific liquid crystal composition S" in the following description.

The liquid crystal display element of the present invention comprises a display functioning layer of the above liquid crystal composition formed in the liquid crystal display element cell.

The liquid crystal display element cell has two sheets of substrates, each provided with a rubbed alignment film. The substrates are held in parallel with the alignment films facing them with a small space between. The rubbing directions for each substrate are preferably parallel. At least one of the two substrates is highly transparent and the liquid crystal composition is filled into the space in the liquid crystal display element cell to form a display functioning layer.

In addition to the rubbed alignment film, alignment films provided with a liquid crystal alignment capability by irradiation with polarized ultraviolet radiation, ion beams, or the like may be used. The direction of rubbing in each substrate may not necessarily be parallel, but may be counter parallel or vertical.

In the liquid crystal display element in which the display-functioning layer is formed by the specific liquid crystal composition S, the phase state of the liquid crystal composition is determined by the temperature conditions of the display-functioning layer relative to a phase transition temperature T1 (liquid crystal gelling temperature, i.e. the temperature below which the liquid crystal is gelatinized) inherent to the materials forming the liquid crystal composition. Specifically, the liquid crystal composition exhibits an isotropic liquid phase state at temperatures higher than the phase transition temperature T1 as shown in FIG. 1(a). In FIG. 1, long and narrow oval globules (LC) indicate molecules of a liquid crystal compound (liquid crystal molecules) and round globules (G) indicate molecules of the hydrogen-bonded compound of a gelling agent (gelling agent molecules).

The phase transition temperature T1 of this specific liquid crystal composition S is 42° C. Specifically, the specific liquid crystal composition S has an isotropic-liquid crystal (nematic state) phase transition temperature of 76° C., liquid crystal (nematic state)-liquid crystal (smectic A state) phase transition temperature of 65° C., and liquid crystal (smectic A state)-liquid crystal gel (smectic A state) phase transition temperature of 42° C.

When the temperature of the display-functioning layer is lower than the phase transition temperature T1, the liquid crystal molecules (LC) in the liquid crystal composition exhibit the smectic A phase state aligned in the rubbing direction (left to right) indicated by an arrow in FIG. 1(b), whereas the gelling agent molecules (G) elongate and aggregate in the form of a string in the direction vertical to the rubbing direction, thereby forming fibrous aggregates Ga to be gelatinized. The gelatinized state of liquid crystal molecules (LC) is hereinafter referred to as "aligned gelatinized state."

Although the aligned gelatinized state is stable, the liquid crystals change into the isotropic liquid phase state shown in FIG. 1(a), if heated to a temperature above the phase transition temperature T1 or the later-described phase transition temperature T2. In this manner, the liquid crystal composition in the display-functioning layer reversibly changes between the isotropic liquid phase state and the aligned gelatinized state according to temperature conditions.

Therefore, in the liquid crystal display element in which the display-functioning layer is formed from the specific liquid crystal composition S, the phase state can be reversibly changed between the isotropic liquid phase state and the aligned gelatinized state by controlling the temperature conditions using the phase transition temperatures T1 and T2 as the standards. This phenomenon can be utilized for displaying a variety of visual information in the same manner as in conventional liquid crystal display elements.

If the display-functioning layer in the aligned gelatinized state shown in FIG. 1(b) is irradiated with UV light at a wavelength of 365 nm, for example, at room temperature from outside the liquid crystal display element, the photoinitiator C in the specific liquid crystal composition S is activated and causes the hydrogen-bonded compound B of the gelling agent to polymerize by a crosslinking reaction. As a result, the hydrogen-bonded compound B is polymerized retaining the fibrous aggregates Ga as is, whereby fibrous polymer P elongating in the direction vertical to the rubbing direction is formed (See FIG. 2).

To distinguish the liquid crystal composition in which the fibrous polymer P has been formed from the liquid crystal composition before irradiation with UV light, the former is herein called "denatured liquid crystal composition" and the latter is called "non-denatured liquid crystal composition." In addition, the region in the display-functioning layer formed from the denatured liquid crystal composition is called "denatured display-functioning region" and the region formed from the non-denatured liquid crystal composition is called "non-denatured display-functioning region."

In the denatured liquid crystal composition in which the fibrous polymer P has been formed, the liquid crystal composition gels immediately after irradiation with UV light. The alignment state of liquid crystal molecules (LC) is dependent on the temperature conditions of the display-functioning layer relative to the phase transition temperature inherent to the system. Specifically, at temperatures higher than the phase transition temperature T2, at which liquid crystal molecules (LC) become aligned, the liquid crystal molecules (LC) are randomly distributed as shown in FIG. 2(a), remain in the gelatinized physical state, and are isotropic in the molecular arrangement structure.

The denatured liquid crystal composition in this specific liquid crystal composition S has an isotropic-liquid crystal gel (nematic state) phase transition temperature of 77° C. and a liquid crystal gel (nematic state)-liquid crystal gel (smectic A state) phase transition temperature of 67° C. The isotropic gel exhibits high heat resistance and is stable at temperatures of 150° C. or less. The phase transition temperature T2 is 77° C. or 67° C.

Figure 2A:
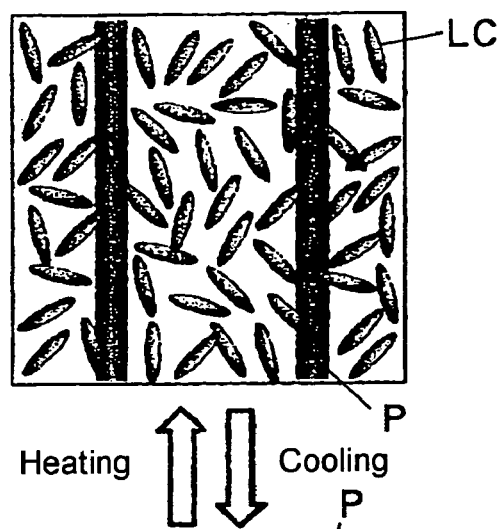
FIG. 2(a) is a drawing schematically showing the conditions of liquid crystal molecules and fibrous polymer in an isotropic phase state of a denatured liquid crystal composition produced by denaturing the liquid crystal composition of FIG. 1, and FIG. 2(b) schematically shows the conditions when the liquid crystal composition is in an aligned gelatinized state.
Figure 2B:
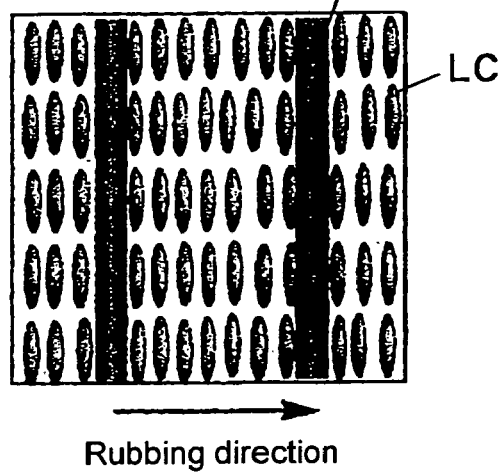

When the gel obtained by irradiating with UV light is heated to become isotropic, then cooled to a temperature below the phase transition temperature T2, for example, a temperature lower than 67° C., and maintained at this temperature, the alignment of the liquid crystal molecules (LC) is regulated by the fibrous polymer P as shown in FIG. 2(b). Specifically, the liquid crystal molecules (LC) are aligned in the direction parallel to the fibrous polymer P or vertical to the rubbing direction. FIG. 2(b) shows the state of smectic A phase.

Although the aligned gelatinized state of the denatured liquid crystal composition is stable, the liquid crystals become isotropic as shown in FIG. 2(a) if heated to a temperature above the phase transition temperature T2. In this manner, the denatured liquid crystal composition in the display-functioning layer reversibly changes between the isotropic state and the aligned state according to temperature conditions.

Therefore, in the liquid crystal display element in which the display-functioning layer is formed from the denatured liquid crystal composition in the specific liquid crystal composition S, the phase state can be reversibly changed between the isotropic state and the aligned state by controlling the temperature conditions by using the phase transition temperature T2 as the standard. This phenomenon can be utilized for displaying a variety of visual information in the same manner as in conventional liquid crystal display elements.

In the present invention, one liquid crystal display element may be provided with a display-functioning layer in which the above-described non-denatured display-functioning region of the non-denatured liquid crystal composition and the denatured display-functioning region of the denatured liquid crystal composition are arranged in an appropriate pattern.

More specifically, in the liquid crystal display element in which the specific liquid crystal composition S is filled in the cell space, the entire display-functioning layer is a non-denatured display-functioning region. If UV light is selectively irradiated over the entire display-functioning layer of this state, the non-denatured liquid crystal composition in the irradiated regions is converted into the denatured liquid crystal composition forming denatured display-functioning regions, whereas the regions that have not been irradiated with UV light remain as non-denatured display-functioning regions since the non-denatured liquid crystal composition remains as is. As a result, a display-functioning layer containing both denatured display-functioning regions and denatured display-functioning regions is formed.

In the above procedure, UV light from a UV light radiation lamp is selectively shone via an appropriate photo mask onto a display-functioning layer of a liquid crystal display element filled with non-denatured liquid crystal composition. A display-functioning layer consisting of non-denatured display-functioning regions and denatured display-functioning regions according to the photo mask pattern can be formed in this manner.

Figure 3:
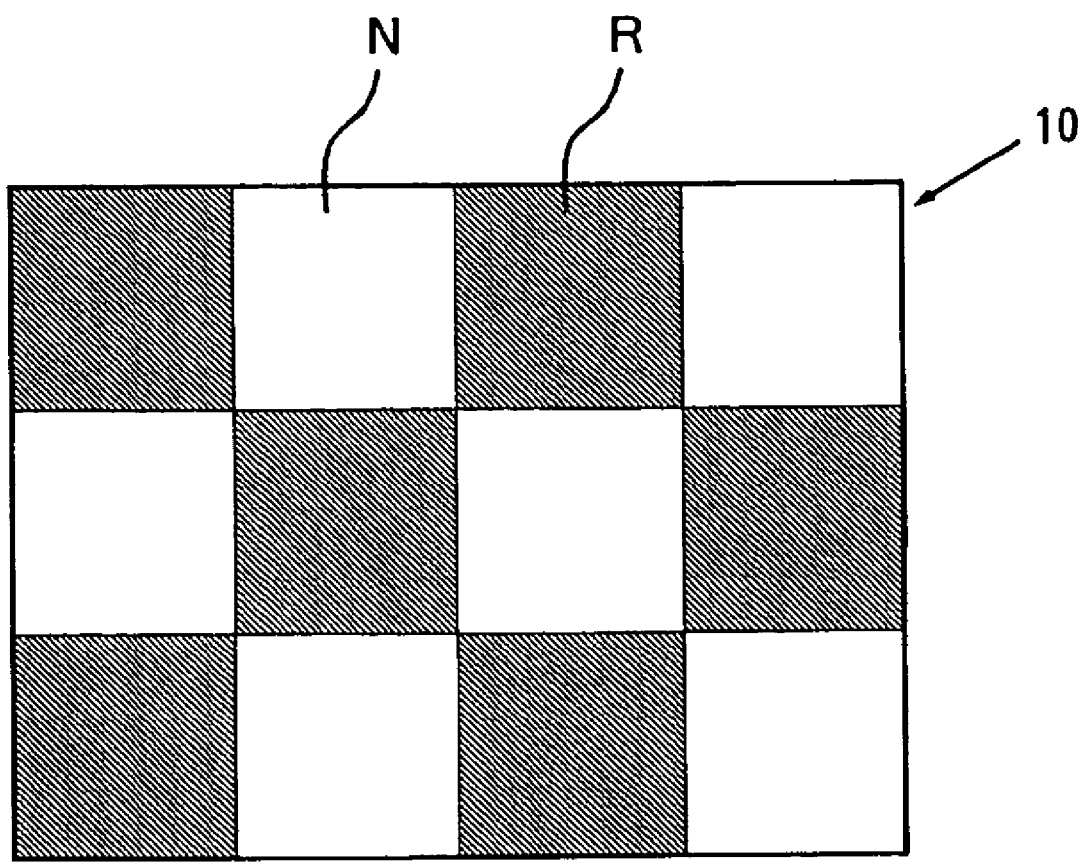
FIG. 3 is a drawing showing one embodiment of alignment conditions of non-denatured display-functioning regions and denatured display-functioning regions in the display-functioning layer of the liquid crystal display element of the present invention.

FIG. 3 shows a display-functioning layer 10 in which a number of square non-denatured display-functioning regions N and a number of denatured display-functioning regions R are arranged to form a checkered pattern.

In this display-functioning layer 10, the phase transition temperature T1 for gelatinizing the liquid crystal of the non-denatured liquid crystal composition in the non-denatured display-functioning regions N is 42° C., whereas the phase transition temperature T2 of the denatured liquid crystal composition in the denatured display-functioning regions R is 77° C. (nematic phase) or 67° C. (smectic A phase). Therefore, if the display-functioning layer 10 is heated above the phase transition temperature T2, the non-denatured display-functioning regions N are in an isotropic liquid state shown in FIG. 1(a) and the denatured display-functioning regions R are in an isotropic liquid state shown in FIG. 2(a), enabling the display-functioning layer 10 to reflect and scatter incident light.

On the other hand, if the display-functioning layer 10 is maintained at a temperature below the phase transition temperature T1 (42° C.), the liquid crystal molecules (LC) in the non-denatured display-functioning regions N are in a gelatinized state aligned in the direction parallel to the rubbing direction shown in FIG. 1(b), whereas the liquid crystal molecules (LC) in the denatured display-functioning regions R are aligned in the direction vertical to the rubbing direction (smectic A phase) shown in FIG. 2(b). Therefore, the display-functioning layer 10 transmits light incident from specific directions and blocks light incident from other directions.

When the temperature of the display-functioning layer 10 is maintained between the phase transition temperatures T1 and T2, the non-denatured display-functioning regions N exhibit a liquid crystal state in which the liquid crystal molecules are aligned in the direction parallel to the rubbing direction, whereas the denatured display-functioning regions R are brought to the aligned state corresponding to the temperature. Incident light is optically affected corresponding to the aligned state of the liquid crystal molecules.

Since the denatured display-functioning regions R and the non-denatured display-functioning regions N formed by irradiation with UV light exhibit different optical actions to the incident light in this manner, image information corresponding to a photo mask pattern can be displayed on the display-functioning layer 10 by controlling the temperature of the display-functioning layer 10. Therefore, the liquid crystal display element possessing the display-functioning layer 10 can display image information corresponding to the original image.

The liquid crystal composition of the present invention can control the direction of alignment of liquid crystal molecules by itself (alignment direction self-control characteristics) in a denatured state, whereby it is possible to align liquid crystal molecules in a direction that differs from the rubbed direction in a liquid crystal display element.

Specifically, the state of the liquid crystal composition of the present invention can be reversibly changed between the isotropic state and the aligned gelatinized state by controlling the temperature conditions as the non-denatured liquid crystal composition. Since a denatured liquid crystal composition obtained by photo polymerization of the non-denatured liquid crystal composition in the aligned gelatinized state is a liquid crystal gel that can control the alignment direction by itself, the state of such a denatured liquid crystal composition can be reversibly changed between the isotropic state and the aligned state by controlling the temperature.

Using the liquid crystal display element of the present invention, a unique display function can be obtained by utilizing both the display function of the non-denatured liquid crystal composition in the non-denatured display-functioning regions and the display function utilizing the alignment direction self-control characteristics of the denatured liquid crystal composition in the denatured display-functioning regions.

According to the method of manufacturing the liquid crystal display element of the present invention, a display-functioning layer possessing the non-denatured display-functioning regions of non-denatured liquid crystal composition and the denatured display-functioning regions of denatured liquid crystal composition can be formed by a simple means.

According to the method of controlling the liquid crystal display element of the present invention, display conditions in non-denatured display-functioning regions and denatured display-functioning regions can be controlled in a variety of means by controlling the temperature of the display-functioning layer by using the phase transition temperature T1, at which liquid crystal molecules of non-denatured liquid crystal composition in the non-denatured display-functioning regions become in an aligned gelatinized state, and the phase transition temperature T2, at which liquid crystal molecules of the denatured liquid crystal composition in the denatured display-functioning regions become in an aligned state, as standards.

Obviously, numerous modifications and variations of the present invention are possible in light of the above teachings. It is therefore to be understood that, within the scope of the appended claims, the invention may be practiced otherwise than as specifically described herein.

The invention claimed is:

1. A liquid crystal composition comprising a liquid crystal compound, a gelling agent comprising a hydrogen-bonded compound with polymerizable double bonds at both ends, and a photoinitiator; wherein the gelling agent forms a gelatinizable mixture with the liquid crystal compound; and wherein the photoinitiator, if activated, causes a polymerization reaction of the hydrogen-bonded compound of the gelling agent.

2. The liquid crystal composition according to claim 1, wherein the liquid crystal compound is a cyanobiphenyl liquid crystal compound.

3. The liquid crystal composition according to claim 1 or 2, wherein the gelling agent is a hydrogen-bonded compound of the following formula (1),

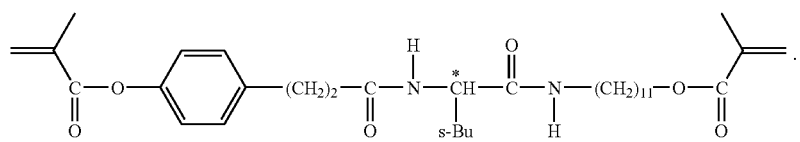

4. The liquid crystal composition according to claim 2, wherein the photoinitiator is a compound of the following formula (2),

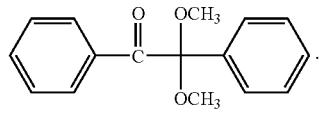

5. A liquid crystal display element comprising two sheets of rubbed substrates and a display-functioning layer formed between the substrates comprising non-denatured display function regions of the liquid crystal composition according to any one of claims 1, 2 or 4 wherein fibrous aggregates in which the hydrogen-bonded compound of the gelling agent is aligned by aggregation are formed in the non-denatured display function regions and alignment of liquid crystal molecules is regulated in the rubbing direction.

6. A liquid crystal display element comprising two sheets of rubbed substrates and a display-functioning layer formed between the substrates comprising denatured display function regions of a denatured liquid crystal composition obtained by photopolymerization of the liquid crystal composition according to any one of claims 1, 2 or 4, wherein the direction of alignment of liquid crystal molecules in the denatured display-functioning regions is regulated by aligned fibrous polymer molecules produced by photopolymerization.

7. A liquid crystal display element comprising two sheets of rubbed substrates and a display-functioning layer formed between the substrates, the display-functioning layer comprising non-denatured display-functioning regions of the liquid crystal composition according to any one of claims 1, 2 or 4, wherein fibrous aggregates in which the hydrogen-bonded compound of the gelling agent is aligned by aggregation are formed in the non-denatured display function regions and alignment of liquid crystal molecules is regulated in the rubbing direction and denatured display-functioning regions of a denatured liquid crystal composition obtained by photopolymerization of the liquid crystal composition according to any one of claims 1, 2 or 4, wherein the direction of alignment of liquid crystal molecules in the denatured display-functioning regions is regulated by aligned fibrous polymer molecules produced by photopolymerization.

8. The liquid crystal display element according to claim 5, wherein the two sheets of substrates are parallel in the rubbed direction.

9. A method for manufacturing a liquid crystal display element comprising selectively irradiating with light a layer of the liquid crystal composition according to any one of claims 1, 2 or 4 formed between two sheets of rubbed substrates to form a display-functioning layer comprising non-denatured display-functioning regions and denatured display-functioning regions.

10. A method for controlling a liquid crystal display element comprising non-denatured display-functioning regions of liquid crystal composition, in which the liquid crystal molecules change into an aligned gelatinized state at a phase transition temperature of T1, and denatured display-functioning regions of liquid crystal composition, in which the liquid crystal molecules change into an aligned state at a phase transition temperature of T2, the method comprising regulating the display conditions of the non-denatured display-functioning regions and denatured display-functioning regions by holding the display-functioning layer at a temperature higher than T1 or T2, whichever the higher, holding the display-functioning layer at a temperature lower than T1 or T2, whichever the lower, or holding the display-functioning layer at a temperature between T1 and T2.

11. The liquid crystal composition of claim 1, wherein the hydrogen bonding occurs intermolecularly between molecules of gelling agent.

12. The liquid crystal composition according to claim 3, wherein the photoinitiator is a compound of the following formula (2),

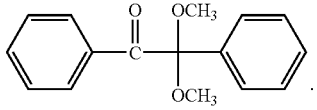

13. A liquid crystal display element comprising two sheets of rubbed substrates and a display-functioning layer formed between the substrates comprising non-denatured display function regions of the liquid crystal composition according to claim 3, wherein fibrous aggregates in which the hydrogen-bonded compound of the gelling agent is aligned by aggregation are formed in the non-denatured display function regions and alignment of liquid crystal molecules is regulated in the rubbing direction.

14. A liquid crystal display element comprising two sheets of rubbed substrates and a display-functioning layer formed between the substrates comprising denatured display function regions of a denatured liquid crystal composition obtained by photopolymerization of the liquid crystal composition according to claim 3, wherein the direction of alignment of liquid crystal molecules in the denatured display-functioning regions is regulated by aligned fibrous polymer molecules produced by photopolymerization.

15. The liquid crystal display element according to claim 6, wherein the two sheets of substrates are parallel in the rubbed direction.

16. The liquid crystal display element according to claim 7, wherein the two sheets of substrates are parallel in the rubbed direction.

17. A method for manufacturing a liquid crystal display element comprising selectively irradiating with light a layer of the liquid crystal composition according to claim 3 formed between two sheets of rubbed substrates to form a display-functioning layer comprising non-denatured display-functioning regions and denatured display-functioning regions.

\* \* \* \* \*